United States Patent [19]

Schneider

[11] Patent Number: 5,088,144

[45] Date of Patent: Feb. 18, 1992

[54] BAR CODE CLEANER

[76] Inventor: Howard Schneider, 149 Finchley Rd., Montreal, Quebec, Canada, H3X 3A3

[21] Appl. No.: 625,493

[22] Filed: Dec. 11, 1990

[51] Int. Cl.⁵ .................................................. B08B 7/00
[52] U.S. Cl. ................................... 15/1.51; 15/236.01; 15/302; 15/308; 15/310
[58] Field of Search .................. 15/236.01, 310, 311, 15/302, 1.51, 308

[56] References Cited

U.S. PATENT DOCUMENTS

| | | | |
|---|---|---|---|
| 2,953,805 | 9/1960 | Sevenich | 15/310 |
| 2,990,562 | 2/1961 | Bishop | 15/310 |
| 3,066,345 | 12/1962 | Kasper | 15/310 |
| 3,137,023 | 6/1964 | Klinge et al. | 15/310 |
| 4,416,702 | 11/1983 | Jackman | 15/311 X |

Primary Examiner—Chris K. Moore

[57] ABSTRACT

A bar code cleaner is disclosed having the ability to allow the removal of foreign material from bar code labels so that they may successfully be read by machine bar code readers. The bar-code cleaner system consists of the apparatus to clean the bar codes and bar code labels manufactured from materials able to physically resist degradation by the apparatus which cleans the bar code. The apparatus to clean the bar code label consists of, mounted in proximity to the machine bar code reader, a scraping edge and/or a duct releasing compressed gas and/or cleaning fluid and/or a duct producing a vacuum.

9 Claims, 4 Drawing Sheets

BAR CODE CLEANER

FIELD OF THE INVENTION

The present invention relates to bar code readers and bar codes.

BACKGROUND OF THE INVENTION

Over the last two decades many products have been manufactured to contain a machine readable bar code. The bar code contains bars (areas which contrast with the optical background) of varying width representing a code number or alphanumeric description. A light beam is passed over the bar code and the reflection of the light beam is registered by a light detector whose output goes to a computing device. The latter converts the signal from the light detector into the code number or alphanumeric description represented by the varying width bars. Various different schemes are in widespread use for the representation of codes by varying width bars, and many of these schemes contain verification digits or characters. As well, various schemes are in widespread use for the reading of the bar codes. Some schemes use a stationary light source in a wand moved by the user while other schemes use a laser light source directed in many different directions each second automatically by rotating mirrors. Advanced schemes such as imaging the entire bar code 'at once' (i.e., much as a video camera images a scene) and then using a computer program to enhance the image and then decode the image, have existed commercially for a number of years but are not yet in widespread use.

A major problem with bar codes is that they often cannot by read by the bar code reader. Occasionally the bar codes have been printed improperly and occasionally the bar codes have worn off. However, in the vast majority of modern products, the reason that the bar code cannot be read is because the bar code is covered with a foreign substance. A common problem in industrial environments is that dirt covers portions of the bar code. A common problem in supermarket retail environments is that water or ice has condensed over portions of the bar code.

One solution to dirty or occluded bar codes is to use a more powerful light source to read the bar code. A problem with this solution is that high amplitude concentrated light sources represent a danger to human sight. Another solution to dirty or occluded bar codes is for the operator of the bar code reader to somehow clean the bar code with an article of clothing, a piece of tissue or a piece of paper. However, the 10 to 15 seconds it takes to clean the bar code in such a fashion is significantly longer than the time it will take the operator to manually key into a keypad the product code typically printed beneath the bar code.

Bianco, U.S. Pat. No. 4,263,503, proposes a bar code label protection device. While such a device provides a solution to the prevention of dirty or occluded bar codes, such a device is not economical for use on inexpensive retail items.

SUMMARY OF THE INVENTION

The present invention describes a method and apparatus which allows operators of a bar code reader to very quickly clean a dirty or occluded bar code.

The apparatus composing the bar code cleaner consists of a scraping edge, typically a straight edge, mounted in proximity to the bar code reader. The scraping edge can be supplemented, or in some implementations replaced, by a duct mounted in proximity to the bar code cleaner. Compressed air or a cleaning fluid can be released by the duct to aid in the removal of foreign material from the bar code label. If the operator sees initially that the bar code is dirty or occluded, or if the bar code reader failed to successfully read the bar code, then the operator quickly rubs the bar code against the straight edge mounted in proximity to the bar code reader (and/or against the duct blowing air or cleaning fluid). In doing so, the straight edge (and/or the cleaning fluid or blowing air) will scrape off the layer of dust, dirt, water, ice, etc. occluding the bar code. Various embodiments of this aspect of the invention are possible. In particular, it is useful in different environments to slightly modify the typically straight scraping edge. For example, in environments where there is much ice build-up, it is useful to place small teeth on the straight edge. For example, in environments where bar codes are typically on curved packages, it is useful to give an appropriate curve to the scraping edge. It is a requirement of the invention that the bar codes be printed with an ink that will not be scraped off significantly (i.e., as to significantly reduce a successful read of the bar code by the bar code reader) by the scraping edge. If the ink or pigment composing the bar code in fact is vulnerable with respect to the scraping edge, then the bar code would have to be laminated with an optically transparent (i.e., for the light frequency of the bar code reader), physically resistant substance. Similarly, if the scraping edge is supplemented by a duct blowing air or cleaning fluid, it is necessary that the bar code pigment not be significantly degraded by the blowing air or the cleaning fluid. If the pigment is vulnerable to either of the latter, then the bar code would have to be laminated with an optically transparent, physically resistant substance.

DESCRIPTION OF PREFERRED EMBODIMENTS AND PRACTICES

Figure 1:
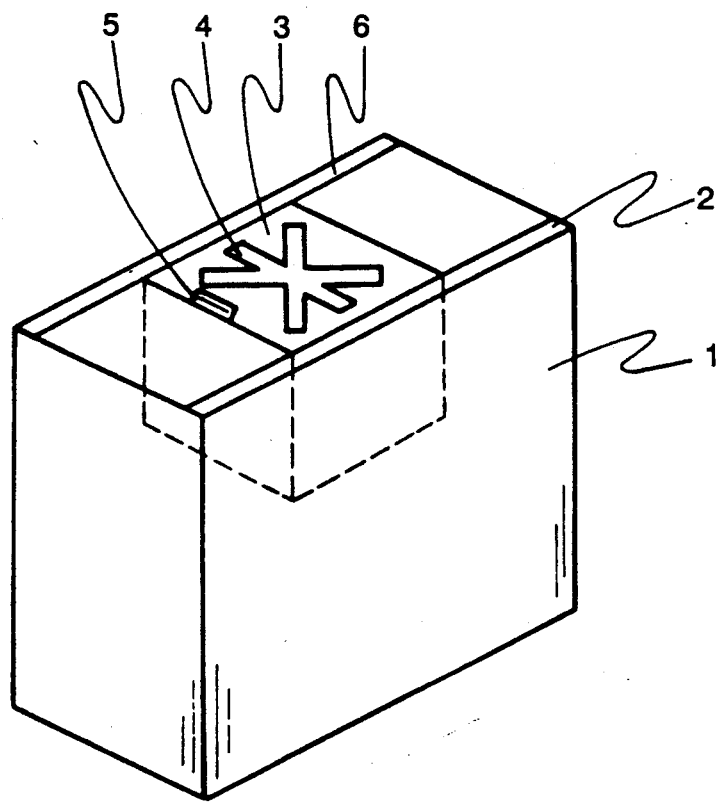
FIG. 1 is a perspective view showing the configuration of a preferred embodiment of the bar code cleaner consisting of a straight scraping edge mounted adjacent to a laser bar code scanner.

A preferred embodiment of the bar code cleaner is shown in FIG. 1. In this embodiment the bar code cleaner consists of a straight scraping edge 5 mounted on one side of the bar code reader 3 (which is fastened into housing 1 by rails 2 and 6), but not obstructing the window 4 from which the laser light signal emanates.

In the preferred embodiment shown in FIG. 1, scraping edge 5 consists simply of a straight-edge mounted perpendicular to the surface of the laser bar code reader 3. Of particular importance is that the straight scraping edge 5 is in proximity of the bar code reader 3 so that the operator can very quickly scrape any dust, dirt, water or ice off of the product and then scan again. The straight scraping edge 5 must be constructed of a material that is hard enough to scrape (or push) off dirt or condensation from the bar code label. The scraping edge 5 does not necessarily need to cover the entire height of the bar code. The sharpness of the scraping edge 5 must be considered in relation to how resistant the ink or other pigment composing the bar codes used in the system are to being scraped off along with the dirt or condensation. The scraping edge 5 does not necessarily have to be perpendicular with respect to the bar code scanner, and in fact, different angles may be advantageous for various applications. In the embodiment shown in FIG. 1, the scraping edge 5 could be manufactured from a one-half by three inch rectangle of one-eighth inch plastic or one-sixteenth inch metal.

A straight scraping edge, as depicted in FIG. 1 is typically the easiest to design and fabricate. However, different scraping edges will prove ideal for different types of environments. If the scraping edge will typically be used against ice, then it will prove advantageous to use an edge with fine teeth to disrupt the ice. If the scraping edge will typically be used against curved bar codes, then it will prove advantageous to use a curved edge. A curved edge can be of static dimensions, or be of flexible material to mold itself to the shape of the bar code being cleaned.

The scraping edge will typically scrape foreign material from the bar code. However, it can also be designed and used to push foreign material from the bar code. The angle of mounting and the sharpness of the edge must be adjusted if the edge is to be used for pushing instead of scraping. The scraping edge can also consist of a brush, where the bristles or synthetic equivalents, alternatively scrape and push foreign material from the bar code.

Figure 3:
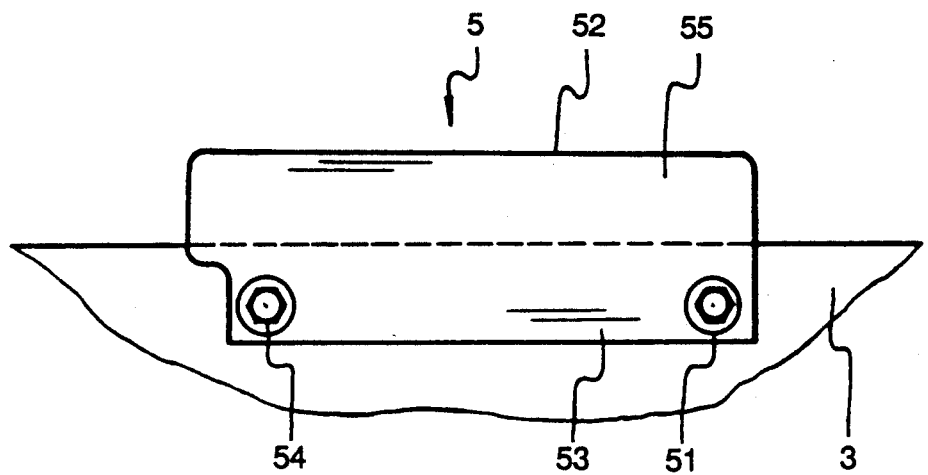
FIG. 3 is a perspective detailed view of a straight scraping edge mounted adjacent to a laser bar code scanner.

FIG. 3 is a more detailed perspective view of the scraping edge 5 assembly. The scraping edge 5 assembly in fact consists of a relatively flat blade 55 containing the actual scraping edge 52 projecting upwards and an opposite edge 53. The blade 55 is fixed via bolts 51 and 54 to a structural support which in this case consists of the actual bar code reader 3.

Figure 4:
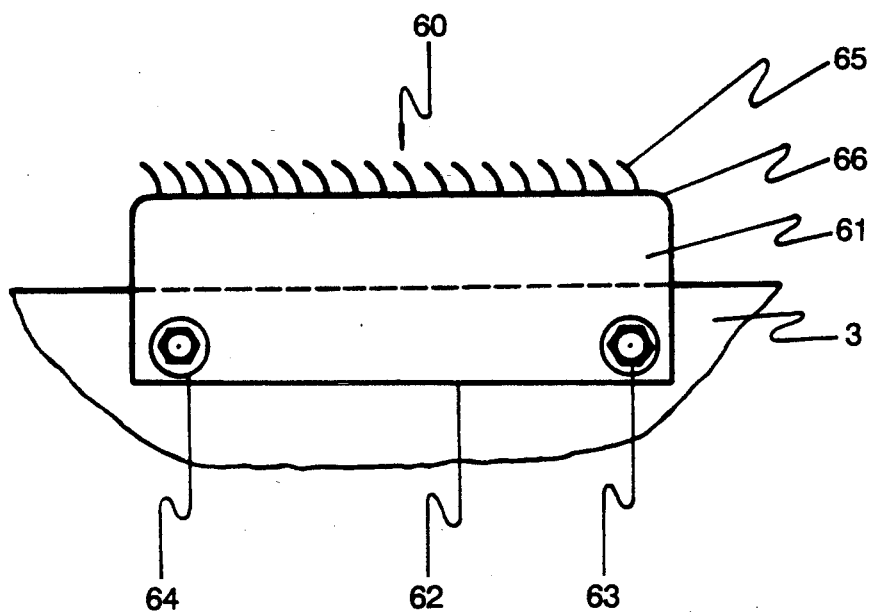
FIG. 4 is a perspective detailed view of a straight scraping/brushing edge mounted adjacent to a laser bar code scanner.

FIG. 4 is a more detailed perspective view of an alternative scraping/brushing assembly 60. The scraping/brushing 60 assembly in fact consists of a relatively flat blade 61 containing the actual scraping edge 66 projecting upwards and an opposite edge 62. The blade 61 is fixed via bolts 63 and 64 to a structural support which in this case consists of the actual bar code reader 3. Bristles 65 are mounted on scraping edge 66.

The scraping edge can be given an electric charge to aid in the removal of charged foreign material from the bar code.

Figure 2:
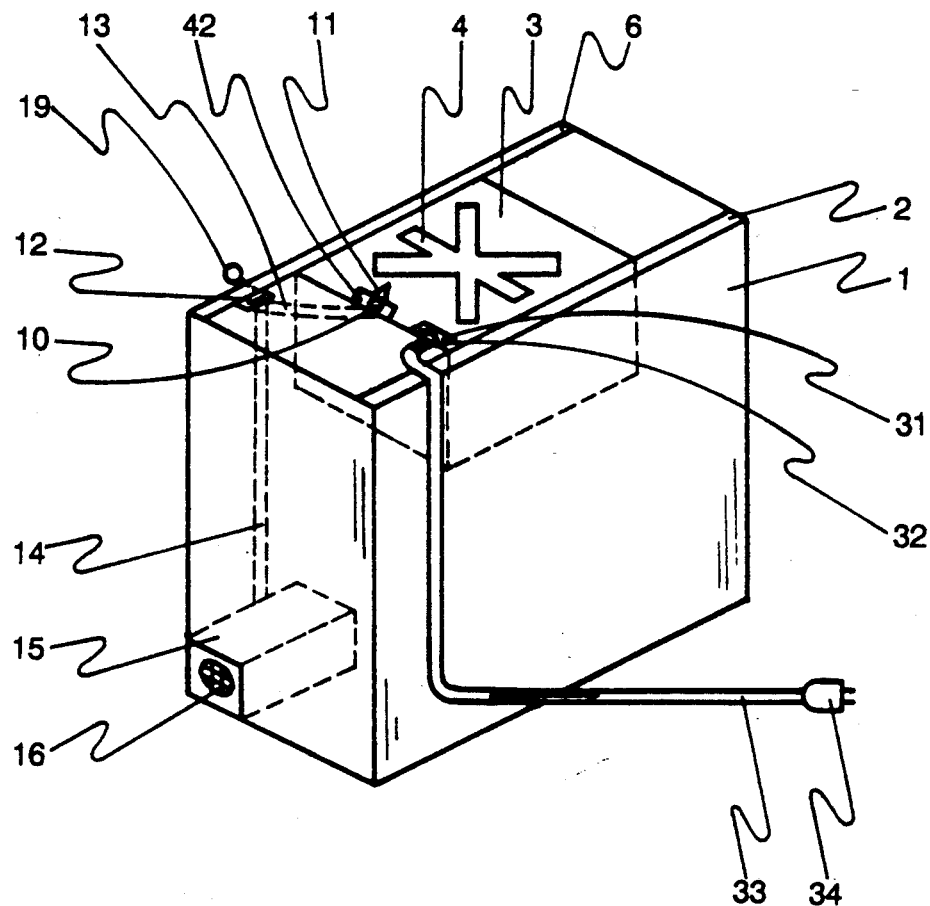
FIG. 2 is a perspective view showing the configuration of a preferred embodiment of the bar code cleaner consisting of a duct and curved, heated scraping edge, both mounted adjacent to a laser bar code scanner.

FIG. 2 is an embodiment of the invention containing a curved, heated scraping edge 31. Within edge 31 is an electric heating element 32 attached to electrical cable 33 attaching in turn to wall plug 34. This embodiment also contains duct 10 formed from plate 42 which is mounted adjacent to code reader 3. An air compressor 15 takes in air from air inlet 16 and blows it into tubing 14, to operator controlled valve 12 which is activated by valve stem 19. When valve 12 is opened by the operator, compressed air flows into tubing 13 and out of duct 10, its direction controlled by guide 11. The bar code cleaner shown in the embodiment of FIG. 2 allows the operator to scrape the dirty or occluded bar code label on heated, scraping edge 31 and then to blow off any remaining foreign material by pressing valve stem 19 and placing the bar code above duct 10.

The air compressor 15 of FIG. 2 could be replaced with a reservoir of cleaning liquid. Similarly, the air compressor 15 of FIG. 2 could be replaced with a vacuum pump and duct 10 would become a vacuum duct. It is possible to envision other embodiments containing a combination of ducts containing cleaning fluid and compressed air, and vacuum ducts to remove both foreign material and cleaning fluid. Similarly, it is also possible to envision other embodiments where the compressed air and or cleaning fluid is heated prior to release. It is also possible to envision embodiments whereby there is no scraping edge but only the duct system.

Those skilled in the art will be able to ascertain, using no more than routine experimentation, other equivalents for the method and apparatus above described. Such equivalents are to be included within the scope of the following claims.

I claim:

1. A bar code cleaning system consisting of:
   (a) bar code reader means anchored to a stationary ground-supported member;
   (b) a blade member comprising a scraping edge projecting upwards from said stationary ground-supported member and clearing same, and having an opposite edge anchored to said stationary ground-supported member in proximity to said bar code scanner means;
   (c) heating means mounted in proximity to said blade member so as to heat said blade member;
   (d) a plate mounted to said stationary ground-supported member so as to be proximal to both said bar code scanner means and said blade member, and wherein said plate contains an opening;
   (e) a tubular structure operatively connected and in fluid communication with said plate;
   (f) air compressor means feeding said tubular structure with compressed air;
   (g) valve means operatively connected and in fluid communication with said tubular structure so that when said valve means is activated said compressed air is allowed to pass through said valve means and exit at the outlet defined by said plate;
   (h) bar code labels consisting of a pigment substrate able to resist degradation when scraped and heated by said blade member and blown by the said compressed air exiting from said plate so as to then be of sufficient quality to be successfully read by the said bar code reader means;

wherein said cleaning system is for use to clean said bar code labels immediately prior to bar code scanning thereof by first heated scraping of said bar code labels by said scraping edge followed by activation of said valve means and the blowing of said bar code labels by said compressed air to remove remaining particulate matter followed by the immediate bar code scanning of said bar code labels by said scanner means.

2. The bar code cleaning system of claim 1 where a fixed curve is given to the said scraping edge.

3. The bar code cleaning system of claim 1 where said scraping edge is fabricated from a flexible material so that a curve approximating the curve of the bar code label results during scraping.

4. The bar code cleaning system of claim 1 where an electric charge is given to the said scraping edge so as to attract off foreign charged material from the bar code label.

5. The bar code cleaning system of claim 1 where a cleaning fluid is added to said tubular structure so as to aid in the removal of foreign material from the bar code label.

6. The bar code cleaning system of claim 5 where a vacuum duct exists to aid in the disposal of any cleaning liquids.

7. The bar code cleaning system of claim 1 where a vacuum duct is in proximity of the scraping edge to aid in the disposal of foreign material.

8. The bar code cleaning system of claim 1 where said scraping edge contains teeth.

9. The bar code cleaning system of claim 1 where said scraping edge contains bristles.

* * * * *